UNITED STATES PATENT OFFICE.

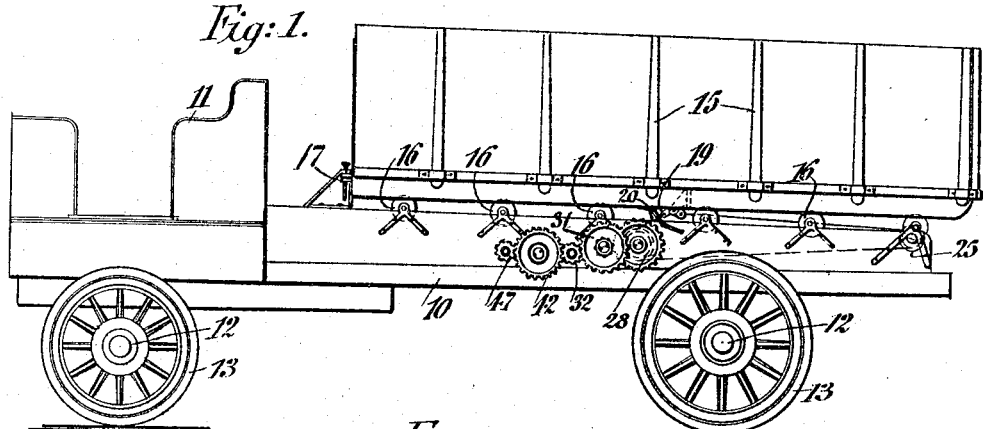

HENRY M. SIOR, OF NEW YORK, N. Y.

DUMPING MECHANISM FOR TRUCK-BODIES.

1,195,519.  Specification of Letters Patent.  Patented Aug. 22, 1916.

Application filed November 18, 1913. Serial No. 801,727.

*To all whom it may concern:*

Be it known that I, HENRY M. SIOR, a citizen of the United States, and a resident of New York, in the borough of Brooklyn, county of Kings, and State of New York, have invented certain new and useful Improvements in Dumping Mechanisms for Truck Bodies, of which the following is a specification.

This invention relates to dumping bodies and more particularly to those used in connection with motor trucks, which are of a considerable size and weight.

The object of my invention is to provide an improved mechanism, which will enable the operator to raise or lower the truck-body without injury to him.

Hitherto in the use of dumping bodies of considerable size, and especially those used on automobile trucks, it has been found that the body portion, when moved rearwardly for the purpose of dumping the contents, would, when it arrived at a certain point, move quickly by the force of gravity, and the handle, by means of which the driving gears are operated, would be so rapidly rotated as to prevent the operator from holding on to the same, thus endangering him.

The object of this invention is to overcome this disadvantageous feature of the trucks now in use, and for this purpose the invention comprises means which will enable the raising and lowering of the body portion in a manner which will not subject the operator to injury.

The invention will be more fully described hereinafter and finally pointed out in the claims.

In the accompanying drawing, Figure 1 is a side view of an automobile truck, with the invention embodied therein, Fig. 2 is an enlarged view of the parts constituting the invention, and Fig. 3 is a plan view of the parts shown in Fig. 2.

Similar reference numerals indicate corresponding parts throughout the several figures of the drawing.

Referring to the drawing, and more particularly to Fig. 1, the automobile frame 10 is provided with the usual seat 11 at the front thereof, and rests on suitable framework, axles 12 and wheels 13, as is well known. It is also well known to have the body portion 15 adapted to contain materials, as ashes, stone, coal, etc., supported on the frame 10 and movable on rollers 16, arranged along the frame, and on which the body 15 rests. The body 15 is provided with fastening means 17 which enable the front of the body 15 to be fastened to the frame 10. This fastening means is locked when the body portion 15 is either full or empty, and is desired to be conveyed from place to place. When it is desired to dump out the contents of the body 15, the fastening means 17 are unlocked, and thereupon the body 15 is moved rearwardly until the greater weight at the rear part of the body 15 serves to dump the body 15 and discharge the contents thereof. For this purpose, the body 15 is provided at its lower portion with a fastening member 19, shown clearly in Fig. 2, to which one end of a cable or chain 20 is secured, which cable or chain passes over a drum 21, and has its other end at 22 secured thereto. Another cable or chain 23 has one of its ends 24 secured to the drum 21, and this is wound in the opposite direction on the drum 21, than the direction of winding of the cable or chain 20, and passes over a pulley or sheave 25 at the rear of the frame 10 and then back again to the fastening means 19 secured to the body 15. The drum 21 is secured to a shaft 27 which extends through the frame 10 and has secured thereto a gear wheel 28, which meshes with a pinion 29 secured to a shaft 30 which in turn has secured thereto a gear wheel 31. The gear 31 meshes with another pinion 32 secured to a shaft 33 seated in the frame 10 and having one end projecting forwardly with a square-shaped end 34 adapted to be engaged by a crank-handle with a correspondingly square-shaped hole for the purpose of engaging the end 34. Thus, by the turning of the shaft 34, and its pinion 32, the gear 31 may be rotated, which rotates the pinion 29, which in turn rotates the gear 28 and thereby the drum 21 is rotated. By the rotation of the drum 21, the cable or chains 20 and 23 are shifted in their position and they cause thereby (the member 17 being released) the body 15 to be moved rearwardly or forwardly as the case may be.

In the case of the body being moved rearwardly, until the greater portion of the weight thereof becomes unsupported, whereupon the dumping of the body 15 takes place, it has been found that prior to this actual dumping of the body 15, the movement of the body is a very rapid one. The force of the moving weight is such that the operator cannot hold on to the handle which engages the free end 34 of the shaft 33, and the handle rotates very rapidly, and very often so rapidly as to be quicker than it is possible for the operator to get his hands or himself out of the way, whereby he is injured. To overcome this disadvantage, and to safeguard the operator in the use of these heavy automobile truck bodies, a gear 40 is arranged on a shaft 46 so as to mesh with the pinion 32. Loosely mounted by its hub 41 on the shaft 46 is a hollow gear 42, which has seated therein a plurality of pawls 43 spring pressed by means of flat springs 44 and adapted to engage a ratchet 45 secured to the shaft 46. This gear 42 engages a pinion 47 secured to the shaft 48, it having again a square-shaped end 49 adapted to engage a correspondingly-shaped socket in the removable handle. Now when it is desired to move the body 15 forwardly, the handle is applied to the end 34, and this is rotated contra-clockwise, whereby the gear 31, pinion 29, and gear 28, together with drum 21, are rotated, the drum 21 being rotated also contra-clockwise, and thereby winding up the cable or chain 20, and drawing the body 15 forwardly toward the fastening means 17 and seat 11.

During the time that the body 15 is moved forwardly or raised in the manner described, there is no danger of the weight of the same overcoming the strength of the operator, as the movement is a forward one in the direction of the forward part of the truck or frame 10 and the body is unloaded. But when it is desired to move the body 15 rearwardly, and especially in the case where such body is heavily loaded, then it is necessary to apply the movable handle to the shaft-end 49 and turn this clockwise, whereby the pinion 47 will rotate the gear 42, whereby the pawls 43 will engage the ratchet-wheel 45, rotate the shaft 46, which will rotate the gear 40 and cause the train, consisting of pinion 32, gear 31, pinion 29 and gear 28, to operate the drum 21. This movement will take place in accordance with the desire of the operator, but should for any reason, the weight of the body 15 become so placed as to induce a sudden and rapid movement of the body 15 so as to ordinarily cause injury to the operator, the drum 21 being rapidly rotated, will set in motion the train, consisting of pinion 29, gear 31, pinion 32 and gear 40, which will rotate the shaft 46. But this shaft will not rotate the gear 42 but will cause the ratchets 45 to ride backward over the pawls 43, and thereby not convey the rapid rotation of the shaft 29 and the drum 21 to the shaft 48 and end 49, and hence to the handle applied thereto. Thus, any sudden movement which would ordinarily rotate the operating handle very rapidly, does not do so, as the motion is spent by the pawls riding idly on the ratchets, and not conveying the rapid movement to the handle applied to the shaft 48. I have found by the use of my invention that the repeated injuries occasioned to operators is avoided, in that the movement of the operating handle can be controlled at will, and whereas injuries would be occasioned almost daily by the use of the old means, the application of my invention prevents such injury to the benefit of the operators.

The improved means are simple in construction, readily applied and form a valuable adjunct to the dumping bodies of automobile trucks.

I claim:

1. In combination, a dumping truck body, a frame therefor, means for moving the truck body longitudinally on the frame, comprising a winding drum and gears connected thereto, coöperating means for giving rearward movement to the said truck body, operating means for actuating said last named means adapted to move free of said last named means upon rearward movement of said truck body in excess of the movement imparted thereto by the said last named means and intermediate means coöperating with the said first named means for giving both forward and rearward movement to the said truck body.

2. In an improved dumping body, the combination of a frame, rollers on the frame, a body portion on the rollers, a cable or chain secured to the body, a drum for winding or unwinding the cable or chain, a train of gears for rotating the drum, a pinion in engagement with said train, adapted to give forward longitudinal motion to the body and to receive motion from the body, a gear movable by said pinion, and provided with a plurality of pawls engaging a ratchet on the shaft of the gear, and means for moving the pawls and ratchet and pinion in one direction by an operating handle to move the body rearwardly, but said pawls and ratchet being arranged to prevent movement of the operating handle in the opposite direction.

In testimony that I claim the foregoing as my invention, I have signed my name in presence of two subscribing witnesses.

HENRY M. SIOR.

Witnesses:
F. HOGG,
ASHER BLUM.